United States Patent [19]
Will et al.

[11] 3,959,020
[45] May 25, 1976

[54] BATTERY CASING AND SEALED PRIMARY SODIUM-HALOGEN BATTERY

[75] Inventors: Fritz G. Will, Scotia, N.Y.; Heinrich J. Hess, Nidau, Switzerland

[73] Assignee: General Electric Company, Schenectady, N.Y.

[22] Filed: Aug. 19, 1974

[21] Appl. No.: 498,264

Related U.S. Application Data
[63] Continuation-in-part of Ser. No. 230,864, March 1, 1972, abandoned.

[52] U.S. Cl............................... 136/86 A; 136/6 FS
[51] Int. Cl.²......................................... H01M 8/10
[58] Field of Search............. 136/83 R, 86 A, 65 A, 136/6 FS

[56] References Cited
UNITED STATES PATENTS

| | | | |
|---|---|---|---|
| 3,629,008 | 12/1971 | Grubb............................... | 136/86 A |
| 3,826,685 | 7/1974 | Dubin et al. ....................... | 136/83 R |
| 3,868,273 | 2/1975 | Will et al. .......................... | 136/83 R |

*Primary Examiner*—John H. Mack
*Assistant Examiner*—H. A. Feeley
*Attorney, Agent, or Firm*—Paul R. Webb, II; Joseph T. Cohen; Jerome C. Squillaro

[57] ABSTRACT

A battery casing and a sealed primary sodium-halogen battery are disclosed wherein the casing includes an open ended inner casing of a solid sodium ion-conductive material, an electronic conductor within the interior of the inner casing, an outer metallic casing including an opening therein and a cover with a central opening therein surrounding the inner casing, fill tubes associated with the respective openings, and a glass sealing the outer casing to the inner casing. A sealed primary sodium-halogen battery has the above type of casing with a sodium anode in one casing and a cathode of a halogen in conductive material in the other casing.

9 Claims, 4 Drawing Figures

U.S. Patent May 25, 1976 Sheet 1 of 2 3,959,020
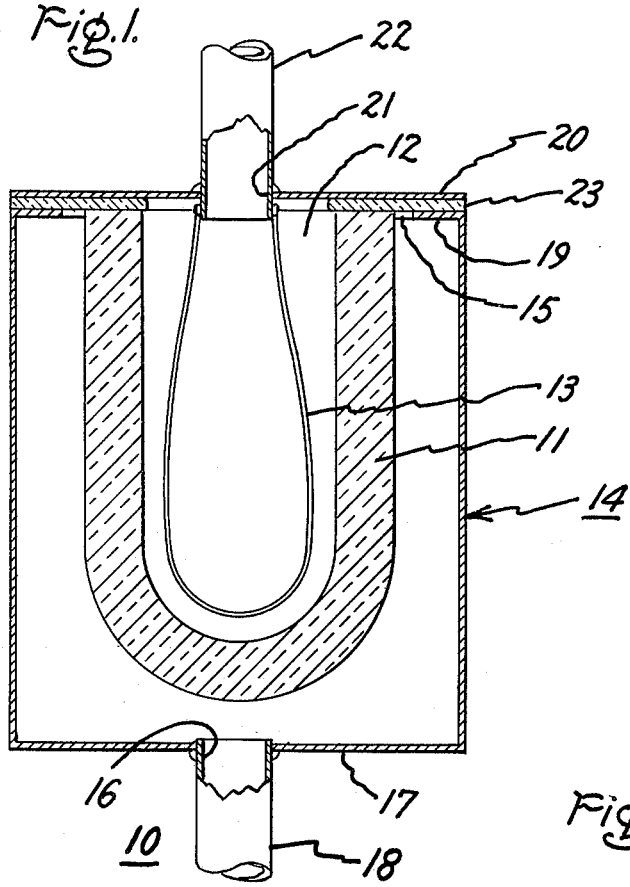
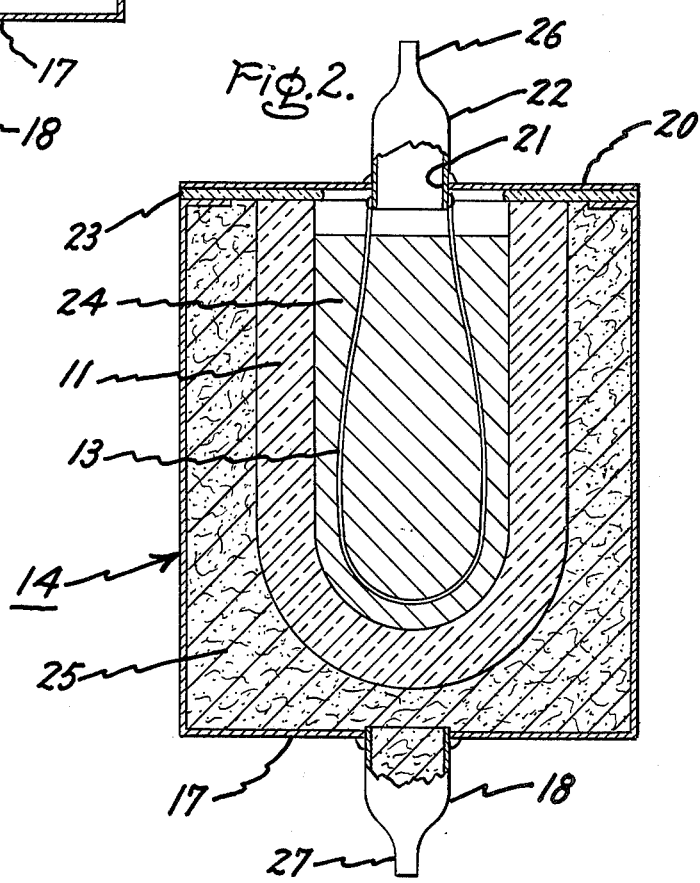

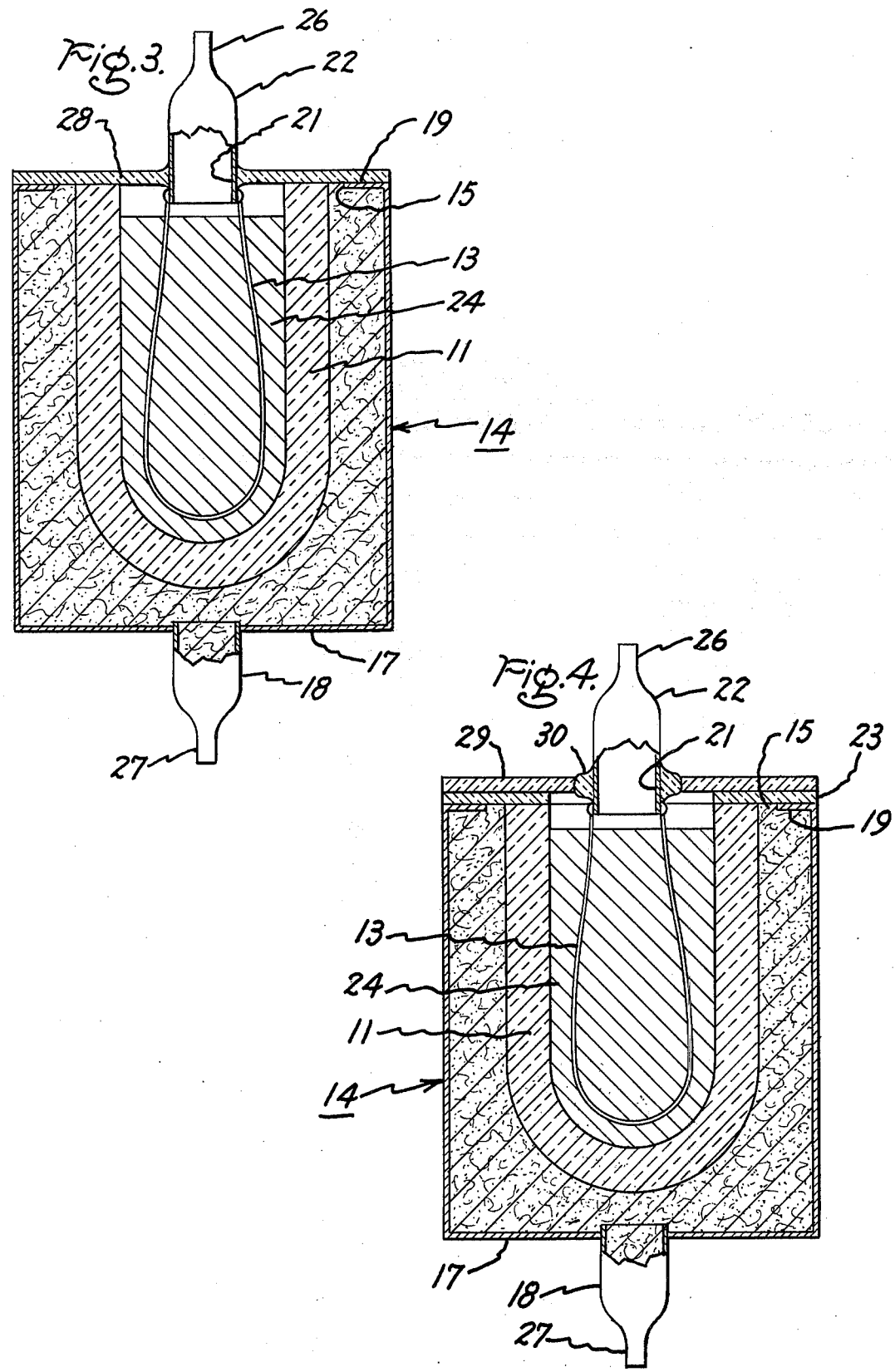

BATTERY CASING AND SEALED PRIMARY SODIUM-HALOGEN BATTERY

This application is a continuation-in-part of application Ser. No. 230,864, filed Mar. 1, 1972, now abandoned, under the same title and in the same names. The subject continuation-in-part application is assigned to the same assignee as the present application.

This invention relates to a battery casing and to sealed primary batteries and, more particularly, to such battery casing and batteries employing an anode of sodium, sodium as an amalgam or sodium in a non-aqueous electrolyte and a cathode of halogen in conductive material.

Sodium-sulfur cells, which operate at elevated temperatures, are known in the prior art as, for example, described in Kummer et al U.S. Pat. No. 3,404,036 issued Oct. 1, 1968 under the title "Energy Conversation Device Comprising a Solid Crystalline Electrolyte and a Solid Reaction Zone Separator." The solid crystalline ion-conductive electrolyte in the above-mentioned sodium sulfur battery can be sodium beta-alumina.

Sodium amalgam-oxygen fuel cells are known in the prior art as, for example, described in Eidensohn U.S. Pat. No. 3,057,946 issued Oct. 9, 1962 under the title "Fuel Cell System." A sodium amalgam is flowed over the face of a metallic plate within an aqueous solution of sodium hydroxide to provide the anode.

In copending patent application Ser. No. 153,364, filed June 15, 1971, now abandoned, entitled "Sealed Primary Sodium-Bromine Battery" in the name of Stephen P. Mitoff and Fritz G. Will, there is described and claimed a sealed primary sodium-bromine battery employing a sodium type anode and a cathode of bromine in conductive material cathode within a casing and separated by a solid sodium ion-conductive electrolyte.

In U.S. Letters Patent 3,793,080 in the name of Heinrich J. Hess and entitled "Sealed Primary Sodium-Halogen Battery with Bromine-Iodine Mixture," there is described and claimed a sealed primary sodium-halogen battery employing a sodium type anode and a cathode of a mixture of bromine and iodine in conductive material. The above copending patent application and the above patent are assigned to the same assignee as the present application.

Our present invention is directed to providing a battery casing and a primary sodium-halogen battery operable at temperatures of −48°C to 100°C which battery operates independent of orientation and allows larger currents to be drawn than from a battery of equivalent size employing a solid electrolyte disk.

The primary objects of our invention are to provide an improved battery casing and a low temperature primary battery which has a zero self-discharge rate, high cell voltage and high energy density.

In accordance with one aspect of our invention, a battery casing includes an open ended inner casing of a solid sodium ion-conductive material, an electronic conductor within the interior of the inner casing an outer metallic casing including an opening therein and a cover with a central opening therein surrounding the inner casing, fill tubes associated with the respective openings, and a reactant resistant glass sealing the outer casing to the inner casing.

These and various other objects, features and advantages of the invention will be better understood from the following description taken in connection with the accompanying drawing in which:

FIG. 1 is a sectional view of a battery casing made in accordance with our invention;

FIG. 2 is a sectional view of a battery made in accordance with our invention;

FIG. 3 is a sectional view of a modified battery; and

FIG. 4 is a sectional view of a further modified battery.

In FIG. 1 of the drawing, there is shown generally at 10 a battery casing embodying our invention which has an inner casing of a solid sodium ion-conductive material 11 with one open end 12. An electronic conductor 13 is positioned within the interior of inner casing 11 and extending outwardly through open end 12 of casing 11. An outer metallic casing 14 has an open end 15 and an opening 16. While opening 16 is shown in the opposite closed end, such opening can be located at other points in casing 14. A metallic fill tube 18 is affixed to closed end 17 and in communication with opening 16. An inwardly extending flange 19 is affixed to metallic casing 14 at its open end 15. Metallic casing 14 surrounds inner casing 11 with the exterior surface of flange 19 flush with the surface of the open end 12 of inner casing 12. Outer casing 14 includes a metallic cover 20 with a centrally disposed opening 21 therein. A metallic fill tube 22 is sealed to cover 20 and communicates with opening 21 therein. Cover 20 closes open end 15 of metallic casing 14. A reactant resistant glass, a sodium and halogen resistant glass 23 seals outer casing 14 to inner casing 11 by sealing cover 20 to the exterior surface of flange 19 and the upper surface of inner casing 11. Electronic conductor 13 is affixed to metallic fill tube 22.

In FIG. 2 of the drawing, there is shown a sealed primary sodium-halogen battery embodying our invention which battery includes the above-described battery casing shown in FIG. 1. An anode 24 is positioned preferably in inner casing 11. Anode 24 which is shown as sodium metal, is selected from the class consisting of sodium, sodium as an amalgam, or sodium in a non-aqueous electrolyte. A cathode 25 of a halogen in conductive material is positioned preferably within outer casing 14 and in contact with both casings 11 and 14. After each casing is filled, the associated fill tubes 18 and 22 are closed, for example, by welding at 26 and 27, respectively. The resulting structure is a sealed sodium-halogen battery.

In FIG. 3 of the drawing, there is shown a modified sealed primary sodium-halogen battery which battery includes the above-described battery casing shown in FIG. 1 with a modified cover. This casing and battery are assembled generally as described above with reference to FIGS. 1 and 2.

The battery of FIG. 3 employs a non-metallic cover 28 of a sodium and halogen resistant glass which has a centrally disposed opening 21 therein. A metallic fill tube 22 is sealed to cover 28 and communicates with opening 21 therein. Cover 28 closes open end 15 of metallic casing 14 by being sealed to the exterior surface of flange 19 and the upper surface of inner casing 11. Electronic conductor 13 is affixed to metallic tube 22. The resulting structure is a sealed sodium-halogen battery.

In FIG. 4 of the drawing, there is shown a further modified sealed primary sodium-halogen battery which battery includes the above-described battery casing shown in FIG. 1 with a modified cover. This casing and battery are assembled generally as described above with reference to FIGS. 1 and 2. The battery of FIG. 4 employs a non-metallic cover 29 of α- or β- alumina which has a centrally disposed opening 21 therein. A metallic fill tube 22 is sealed to cover 29 by means of a high melting point glass seal 30 and communicates with opening 21 therein. Cover 29 closes open end 15 of metallic casing 14. A sodium and halogen resistant glass 23 seals cover 29 to the exterior surface of flange 19 and the upper surface of inner casing 11. Electronic conductor 13 is affixed to metallic tube 22. The resulting structure is a sealed sodium-halogen battery.

We found that we could form a battery casing by positioning an inner casing of an ionic conducting material of sodium beta-alumina having an open end within an outer casing of a suitable, chemically stable material such as niobium or tantalum metal with an open end and an opening which is preferably in the opposite closed end. Other suitable materials for the outer casing include glasses such as Corning Glass No. 7056 and polymers such as high density polytetrafluoroethylene. The outer metallic casing has an inwardly extending flange affixed to its open end. The inner and outer casings are aligned so that the exterior surface of the flange is flush with the surface of the open end of the other casing. At the opposite closed end of the outer casing a metallic fill tube of the same material as the outer casing is affixed and in communication with the opening in the closed end. For use subsequently in a sodium-halogen battery, a reactant resistant glass in the form of a washer of a suitable sodium and halogen resistant glass, such as Corning Glass No. 7056, General Electric Company Glass No. 1013, Sovirel Glass No. 747, or Kimble Glass No. N-51A is positioned on the upper surfaces of the open end of the inner casing and the exterior flange of the outer casing. If a reactant other than a halogen will be used subsequently in the battery, the selected glass is resistant to that reactant. A metallic cover of a suitable, chemically stable metal made of nickel, Kovar alloy, niobium or tantalum with a centrally disposed opening therein has extended therefrom a metallic fill tube of the same metal. The cover and fill tube can be a unitary structure or separate parts which are sealed together, for example, by spot welding. An electronic conductor in the form of a thin wire is formed into a loop and the free ends are welded to the inner edge of the metallic fill tube. The wire is made of one of the above chemically stable metals. The cover is positioned on the opposite surface of the glass washer. The glass washer is then heated to a temperature of 1000°C in a furnace whereby the cover is sealed by the glass to the upper ends of the inner casing and the exterior surface of the flange. This structure results in a battery casing made in accordance with our invention.

A modified battery casing is formed as above-described except that a glass cover with a metallic fill tube is employed. After the metallic tube with attached conductor wire is positioned in the opening of the glass cover, the cover is placed directly on the upper surfaces of the open end of the inner casing and the exterior flange of the outer casing. The glass cover is made of one of the glasses described above for the glass washer. The glass cover and associated casing portions are heated to a temperature of 1000°C in a furnace whereby the cover is sealed to the upper surfaces of the inner casing and the exterior surface of the flange and the fill tube is sealed to the cover. This structure results in a modified battery casing made in accordance with our invention.

A further modified battery casing is formed as above described except that an alpha or beta alumina cover with a metallic fill tube is employed. After the metallic fill tube is positioned in the opening of the alumina cover it is sealed to the cover by employing a high melting point glass such as General Electric Company A glass. The conductor wire is then attached to the metallic tube as previously described. The cover is then positioned on the opposite surface of a glass washer of the same type as previously discussed. Upon heating to a temperature of 1000°C in a furnace the cover is sealed by the glass to the upper surface of the inner casing and the exterior surface of the flange. This structure results in a further modified battery casing made in accordance with our invention.

We found that we could form a sealed primary sodium-halogen battery by employing any of the above-described battery casings. The anode may consist of sodium, a sodium amalgam or sodium in a non-aqueous electrolyte. The anode is positioned preferably within the inner casing by means of the associated fill tube. When the sodium is in the form of a sodium amalgam its range of compositions is from about 95% sodium and 5% mercury by weight to about 35% sodium and 63% mercury. For the fully charged state of the cell, the amalgam composition is preferably high in sodium. Cells using sodium amalgam cannot be used efficiently at temperatures below 21.5°C due to complete freezing of the amalgam.

The use of non-aqueous electrolytes permits battery operation to much lower temperatures as determined by the freezing point of the non-aqueous electrolyte. The preferred electrolyte is propylene carbonate in which a sodium halide salt is dissolved. This electrolyte permits battery operation down to −48°C. After the inner casing has been filled with the anode material the fill tube is closed and sealed, for example, by welding.

The cathode is positioned preferably within the metallic casing through the associated fill tube and is in contact with both casings. The cathode comprises a halogen in conductive material. The halogen is selected from the class consisting of bromine, and a mixture of bromine and iodine with from 5 to 60 weight percent iodine. The electrically conductive materials for the bromine include a porous matrix of carbon felt, a porous matrix of foam metal, an aqueous electrolyte, a non-aqueous electrolyte, or a combination of both matrix and electrolyte. Preferred aqueous electrolytes are solutions of sodium halide salts. Preferred non-aqueous electrolytes are solutions of sodium halide salts in propylene carbonate. The electrically conductive materials for the mixture of bromine and iodine include a porous matrix of carbon felt, a porous matrix of foam metal, dissolved small amounts of additives, such as NaCl, NaBr, KCl, $AlCl_3$, $AlBr_3$, $POCl_3$, etc., or a combination of both matrix and additive. After the halogen in conductive material cathode has been positioned within the metallic casing the associated fill tube is closed, for example, by welding. This results in a sealed primary sodium-halogen battery. As it will be appreciated, the anode and cathode electrodes can be positioned in the opposite casings of the battery.

Examples of battery casings and sealed primary sodium-halogen batteries made in accordance with our invention are set forth below:

EXAMPLE 1

A battery casing was assembled as above-described and as shown in FIG. 1 by positioning an inner casing of an ionic conducting material of sodium beta-alumina having an open end within an outer metallic casing with an open end and an opening in the opposite closed end. The outer metallic casing has an inwardly extending flange affixed to its open end. The inner and outer casings were aligned so that the exterior surface of the flange was flush with the surface of the open end of the other casing. At the opposite closed end of the outer casing a metallic fill tube was affixed and in communication with the opening in the closed end. A glass washer of Corning Glass No. 7056, which is sodium and halogen resistant, was positioned on the upper surfaces of the open end of the inner casing and the exterior flange of the outer casing. A metallic cover of tantalum metal on a centrally disposed opening therein from which is extended a metallic fill tube. An electronic conductor in the form of a 2 mil thick tantalum wire was formed into a loop and the free ends were welded to the inner edge of the tantalum fill tube. The cover was positioned on the opposite surface of the glass washer. The glass washer was then heated to a temperature of 1000°C in a furnace whereby the cover was sealed by the glass to the upper surfaces of the inner casing and the exterior surface of the flange. This structure resulted in a battery casing made in accordance with our invention.

EXAMPLE 2

A sealed primary sodium-bromine battery is assembled by employing the battery casing described above in Example 1. The inner casing is filled with sodium amalgam through the fill tube in the cover after which the fill tube was sealed by welding. The outer casing is filled with carbon felt material and bromine through the associated fill tube after which the fill tube is sealed by welding. The resulting structure is a sealed primary sodium-bromine battery. At room temperature this battery has an open circuit voltage of 3.7 volts.

While other modifications of the invention and variations thereof which may be employed within the scope of the invention have not been described, the invention is intended to include such as may be embraced within the following claims.

What we claim as new and desire to secure by letters patent of the United States is:

1. A battery casing comprises an inner casing of a solid sodium ion-conductive material with one open end, an electronic conductor within the interior of the inner casing and extending outwardly through the open end of the inner casing, an outer metallic casing with an open end and an opening in the outer casing, a metallic fill tube affixed to the outer casing and in communication with the opening and with the interior of the outer casing, an inwardly extending flange affixed to the outer metallic casing at its open end, the outer metallic casing surrounding the inner casing with the exterior surface of the flange on the same plane with the surface of the open end of the inner casing and spaced from the inner casing, a cover having a centrally disposed opening therein, a metallic fill tube sealed to the cover and communicating with the opening therein and with the interior of the inner vessel, the cover closing the open ends of the outer metallic casing and of the inner casing, a low temperature melting glass in contact with the exterior surface of the flange of the outer metallic casing, in contact with the surface at the open end of the inner casing, and in contact with a portion of the interior surface of the cover, the low temperature glass sealing the cover to the exterior surface of the flange of the outer metallic casing and to the surface at the open end of the inner casing, and the electronic conductor within the inner casing and extending outwardly through the open end of the inner casing affixed to the fill tube sealed to the cover.

2. A battery casing as in claim 1, in which the cover is made of a metal.

3. A battery casing as in claim 1, in which the cover is made of a sodium resistant glass.

4. A battery casing as in claim 1, in which the cover is made of alumina selected from the class consisting of alpha alumina and beta-alumina.

5. A sealed primary sodium-halogen battery comprises an inner casing of a solid sodium ion-conductive material with one open end, an electronic conductor within the interior surface of the inner casing and extending outwardly through the open end of the inner casing, an outer metallic casing with an open end and an opposite closed end, an inwardly extending flange affixed to the outer metallic casing at its open end, the outer metallic casing surrounding the inner casing with the exterior surface of the flange on the same plane with the surface of the open end of the inner casing and spaced from the inner casing, a cover having at least a metallic portion, the cover closing the open ends of the outer metallic casing and of the inner casing, a low temperature melting glass in contact with the exterior surface of the flange of the outer metallic casing, in contact with the surface at the open end of the inner casing, and in contact with a portion of the interior surface of the cover, the low temperature glass sealing the cover to the exterior surface of the flange of the outer metallic casing and to the surface at the open end of the inner casing, the electronic conductor within the inner casing and extending outwardly through the open end of the inner casing affixed to the metallic portion of the casing, an anode positioned in one casing, the anode selected from the class consisting of sodium, sodium as an amalgam, and sodium in a non-aqueous electrolyte, and a cathode of a halogen in conductive material in the other casing, the halogen selected from the class consisting of bromine and a mixture of bromine and iodine with from 5 to 60 weight percent iodine.

6. A sealed primary sodium-halogen battery as in claim 5, in which the cover is made of a metal.

7. A sealed primary sodium-halogen battery as in claim 5, in which the cover is made of a sodium and halogen resistant glass.

8. A sealed primary sodium-halogen battery as in claim 5, in which the cover is made of alumina selected from the class consisting of alpha alumina and beta-alumina.

9. A sealed primary sodium-halogen battery as in claim 5, in which the inner casing is sodium beta-alumina, the electronic conductor is a tantalum wire, the outer metallic casing is tantalum, the anode is sodium as an amalgam, the cover is tantalum, and the conductive material of the cathode is carbon felt.

* * * * *